United States Patent
Satomi et al.

(10) Patent No.: US 8,823,831 B2
(45) Date of Patent: Sep. 2, 2014

(54) IMAGE DATA PROCESSING APPARATUS AND METHOD

(75) Inventors: Masashi Satomi, Kawasaki (JP);
Takahiro Asahara, Kawasaki (JP);
Akifumi Izumisawa, Kawasaki (JP);
Shuichi Shiitani, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 542 days.

(21) Appl. No.: 13/213,426

(22) Filed: Aug. 19, 2011

(65) Prior Publication Data

US 2012/0062767 A1 Mar. 15, 2012

(30) Foreign Application Priority Data

Sep. 10, 2010 (JP) ................................. 2010-203027

(51) Int. Cl.
*H04N 5/76* (2006.01)
*H04N 5/222* (2006.01)
*H04N 5/225* (2006.01)
*H04N 5/228* (2006.01)
*G06K 9/36* (2006.01)
*H04N 9/79* (2006.01)
*H04N 5/77* (2006.01)

(52) U.S. Cl.
CPC .............. *H04N 5/772* (2013.01); *H04N 9/7921* (2013.01)
USPC .............. 348/231.99; 348/220.1; 348/333.01; 348/231.9; 348/222.1; 382/166

(58) Field of Classification Search
CPC .... H04N 5/907; H04N 5/232; H04N 5/23293
USPC ................. 348/231.99, 231.2, 231.9, 333.01, 348/222.1, 220.1; 382/166
See application file for complete search history.

(56) References Cited

U.S. PATENT DOCUMENTS

| | | | |
|---|---|---|---|
| 2003/0156212 A1* | 8/2003 | Kingetsu et al. | 348/333.12 |
| 2007/0076959 A1* | 4/2007 | Bressan | 382/224 |
| 2009/0207278 A1* | 8/2009 | Muraki et al. | 348/231.99 |
| 2009/0274365 A1* | 11/2009 | Tsuda et al. | 382/166 |
| 2010/0165151 A1* | 7/2010 | Chitnis et al. | 348/222.1 |

FOREIGN PATENT DOCUMENTS

| | | | | |
|---|---|---|---|---|
| JP | 06-125540 A | 5/1994 | | |
| JP | 2001-128050 A | 5/2001 | | |
| JP | 2001128050 A | * 5/2001 | ............ | H04N 5/225 |
| JP | 2002-185978 A | 6/2002 | | |

(Continued)

OTHER PUBLICATIONS

Office Action of Japanese Patent Application 2010-203027 dated Feb. 18, 2014. Translation of the relevant part, p. 1, line 16 to p. 3, line 21, of the Office Action.

*Primary Examiner* — Nhan T Tran
(74) *Attorney, Agent, or Firm* — Maschoff Brennan

(57) ABSTRACT

In an image data processing apparatus, a conversion unit generates first image data of a first image format and second image data of a second image format and supplies the first and second image data on a time division basis with respect to each image taken by using an image sensor. An operating unit acquires the first and second image data produced on a time division basis from the conversion unit, performs a process for displaying the taken image on a display device by using the first image data, and performs a process for storing the taken image in a storage device by using the second image data.

6 Claims, 12 Drawing Sheets

(56) References Cited

FOREIGN PATENT DOCUMENTS

| JP | 2003-008948 A | 1/2003 |
| JP | 2003-244529 A | 8/2003 |
| JP | 2005-204210 A | 7/2005 |
| JP | 2007-088806 A | 4/2007 |
| JP | 2009-065320 A | 3/2009 |
| JP | 2009-159303 A | 7/2009 |

* cited by examiner

IMAGE DATA PROCESSING APPARATUS AND METHOD

CROSS-REFERENCE TO RELATED APPLICATION

This application is based upon and claims the benefit of priority of the prior Japanese Patent Application No. 2010-203027, filed on Sep. 10, 2010, the entire contents of which are incorporated herein by reference.

FIELD

The embodiment discussed herein is related to an image data processing apparatus that processes data of an image taken by an image sensor, and an image data processing method.

BACKGROUND

Electronic equipment handling digital data of an image taken by an image sensor has been widely used today, including a cellular phone having a digital camera or a camera function. In such electronic equipment, a taken image is displayed on a display device such as a liquid crystal display (LCD), and at the same time, is stored in a storage device such as a flash memory in many cases. Also, electronic equipment having a function (so-called continuous shooting function) capable of continuously taking multiple images at a short time interval is used.

Proposed is equipment in which when an image is stored in a storage device by a joint photographic experts group (JPEG) format, YUV data is generated from image data obtained from an image sensor to store it in a buffer memory, and JPEG data is generated from the YUV data stored in the buffer memory (see, for example, Japanese Laid-open Patent Publication No. 2007-88806). Further, proposed is a display driving device in which when one image of YUV data and another image of RGB data are displayed at the same time, the YUV data stored in a first memory is converted into the RGB data and read out, and at the same time, the RGB data stored in a second memory is read out to thereby mix them (see, for example, Japanese Laid-open Patent Publication No. 2002-185978).

Further, proposed is a device in which when images of multiple channels are stored and transferred at the same time, an identification flag is added to compressed image data of each channel and the compressed image data of multiple channels is multiplexed based on the identification flag (see, for example, Japanese Laid-open Patent Publication No. 06-125540). In addition, proposed is a mobile information terminal in which when flickering on a screen is suppressed during imaging, an image resulting from processing and preparing an image immediately before the pressing is displayed on a display device between the image immediately before pressing a shutter button and that after the pressing (see, for example, Japanese Laid-open Patent Publication No. 2005-204210).

Meanwhile, when a taken image is displayed on a display device and stored in a storage device, one image format of image data for display and another image format of image data for storage may be different from each other. For example, think of the case where YUV data is used for display, and JPEG data is used for storage. However, in that case, a load of an operating device that performs display processing and storage processing easily increases. For example, a digital signal processor (DSP) converts image data acquired from an image sensor into the YUV data. Then, the operating device performs the display processing by using the YUV data, and at the same time, encodes the YUV data and generates the JPEG data for storage. In this case, a load of the encoding is large.

During the continuous shooting operation, for example, when continuously performing the display processing and the storage processing with respect to multiple images taken by an image sensor, a load of the operating device increases. Specifically, a load of the operating device may be bottlenecked, the number of images capable of being continuously processed once may be reduced, and the time interval in which an image is displayed and stored may become longer (rate may be lowered). As a result, a continuous shooting function of electronic equipment may be restricted such as the continuous shooting available time is reduced and an imaging rate during the continuous shooting operation is reduced. For example, if the next image data arrives before the operating device completes encoding processing, the next image data is accumulated as the encoding process waiting until the encoding processing is completed. Further, if the encoding processing with respect to the next image data is completed before the operating device completes the storage processing in the storage device, the next image data is accumulated as the storage process waiting until the storage processing is completed. As the image data of various process waiting more increases, a storage area for maintaining images during the accumulation is exhausted. As a result, the continuous shooting function is restricted.

SUMMARY

According to one aspect of the present invention, this image data processing apparatus to process data of multiple images taken by an image sensor, includes a conversion unit to generate first image data of a first image format and second image data of a second image format and supply the first and second image data on a time division basis with respect to each of the taken images; and an operating unit to acquire the first and second image data supplied on a time division basis from the conversion unit, perform a process for displaying the taken image on a display device by using the first image data, and perform a process for storing the taken image in a storage device by using the second image data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be described below with reference to the accompanying drawings.

First Embodiment

Figure 1:
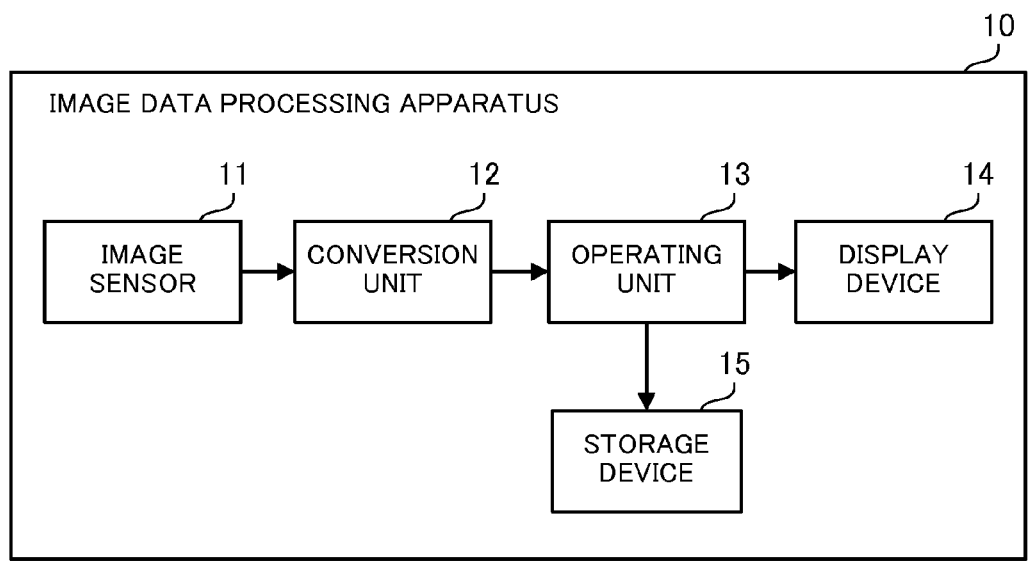
FIG. 1 illustrates an image data processing apparatus according to a first embodiment.

FIG. 1 illustrates an image data processing apparatus according to a first embodiment. The illustrated image data processing apparatus 10 according to the first embodiment includes an image sensor 11, a conversion unit 12, an operating unit 13, a display unit 14, and a storage unit 15.

The image sensor 11 is a semiconductor circuit that takes an image by converting light into an electronic signal. Examples of the image sensor 11 include a charge coupled device (CCD) sensor and a complementary metal oxide semiconductor (CMOS) sensor. The image sensor 11 can continuously take an image at a predetermined frame rate. The image sensor 11 sequentially supplies, for example, RAW data of multiple taken images to the conversion unit 12.

The conversion unit 12 generates first image data of a first image format and second image data of a second image format with respect to the multiple images taken by the image sensor 11, respectively. Based on the RAW data produced from the image sensor 11, for example, the conversion unit 12 generates YUV data as the first image data and JPEG data as the second image data. The conversion unit 12 then supplies the first and second image data on a time division basis to the operating unit 13. For example, when continuously supplying the first and second image data on the same image, the conversion unit 12 alternately supplies them to the operating unit 13.

The operating unit 13 acquires the first and second image data produced on a time division basis from the conversion unit 12. Then, the operating unit 13 displays the taken image on the display device 14 by using the first image data. For example, the operating unit 13 supplies the first image data to the display device 14. In addition, the operating unit 13 stores the taken image in the storage device 15 by using the second image data. For example, the operating unit 13 gives file names to the respective taken images and writes a file including the second image data in the storage device 15. For example, the operating unit 13 alternately performs display processing and storage processing by using the alternately-acquired first and second image data.

Here, from a standpoint of efficiency of data transfer between the conversion unit 12 and the operating unit 13, the conversion unit 12 may insert each of the first and second image data into a common format to supply them to the operating unit 13. In that case, the operating unit 13 extracts from the common format the first image data or second image data inserted into the format. A size of the common format may be determined according to the number of pixels in the image stored in the storage device 15, namely, the number of pixels in the second image data. Further, the common format may include header information indicating an image format of the inserted image data. In that case, the operating unit 13 refers to the header information, and switches over an extraction method of the image data.

The display device 14 sequentially displays multiple taken images. Examples of the display device 14 include an LCD and an organic electro luminescence (EL). For example, the display device 14 acquires YUV data from the operating unit 13 at 3 frames per second (fps), and displays the taken image at 3 fps. Note that when suppressing a flicker on a screen, the operating unit 13 may control to make the display device 14 display a dummy image such as a black image between the taken images.

The storage device 15 sequentially stores the multiple taken images. Examples of the storage device 15 include a nonvolatile memory such as a flash memory. The storage device 15 may be fixedly provided within the image data processing apparatus 10, or detachable from it. In the storage device 15, for example, the operating unit 13 writes a file including JPEG data at 3 fps. The image data processing apparatus 10 may be able to change the number of pixels in the image stored in the storage device 15. In that case, the operating unit 13 may specify the number of pixels at the time of generating the second image data to the conversion unit 12.

In the above-described image data processing apparatus 10, the conversion unit 12 generates the first image data of the first image format and the second image data of the second image format with respect to each of the multiple images taken by using the image sensor 11, and supplies the first and second image data on a time division basis to the operating unit 13. The operating unit 13 displays the multiple images on the display device 14 by using the first image data from among the first and second image data supplied on a time division basis. In addition, the operating unit 13 stores the multiple images in the storage device 15 by using the second image data from among the first and second image data supplied on a time division basis.

This process permits the image data processing apparatus to smoothly perform continuous processes of the multiple images. Specifically, the conversion unit 12 generates both of the image data for display and the image data for storage, and supplies them on a time division basis to the operating unit 13. Therefore, also when continuously displaying and storing the multiple images, the conversion unit 12 can suppress a load of the operating unit 13. As a result, the conversion unit 12 can suppress a load of the operating unit 13 from being bottlenecked and continuous processes of the multiple images from being restricted (e.g., the continuous shooting available time is restricted).

In addition, when the conversion unit 12 supplies the first and second image data by using the common format to the operating unit 13, the operating unit 13 is easy to alternately extract them. The common format is used effectively, for example, when treating an image format in which even if the number of pixels is the same, a data length is different from each other depending on the image as if a JPEG format. Suppose, for example, that JPEG data and YUV data are output not by using the common format but by using respective unique formats. In that case, the operating unit 13 needs the time for switching over variable length data and fixed length data, and as a result reduction in a frame rate is caused. Suppose, on the other hand, that the JPEG data and the YUV data are output by using the common format. In that case, since the time for switching over the variable length data and the fixed length data is suppressed, the operating unit 13 is easy to extract the JPEG data and the YUV data.

In addition, the image data processing apparatus 10 can be mounted on various electronic equipment such as a digital camera and a cellular phone. The image sensor 11, the display device 14, and the storage device 15 may be provided outside the image data processing apparatus 10. In other words, the conversion unit 12 may acquire data on the taken image from the image sensor provided outside the image data processing apparatus 10. Further, the operating unit 13 may display an image on the display device provided outside the image data processing apparatus 10, and store an image in the storage device provided outside the image data processing apparatus 10.

The following second embodiment includes an example of a cellular phone having a camera function. Note that an image data processing method according to the second embodiment can be applied to every electronic equipment except a cellular phone, such as an information terminal device with no digital camera and speech function.

Second Embodiment

Figure 2:
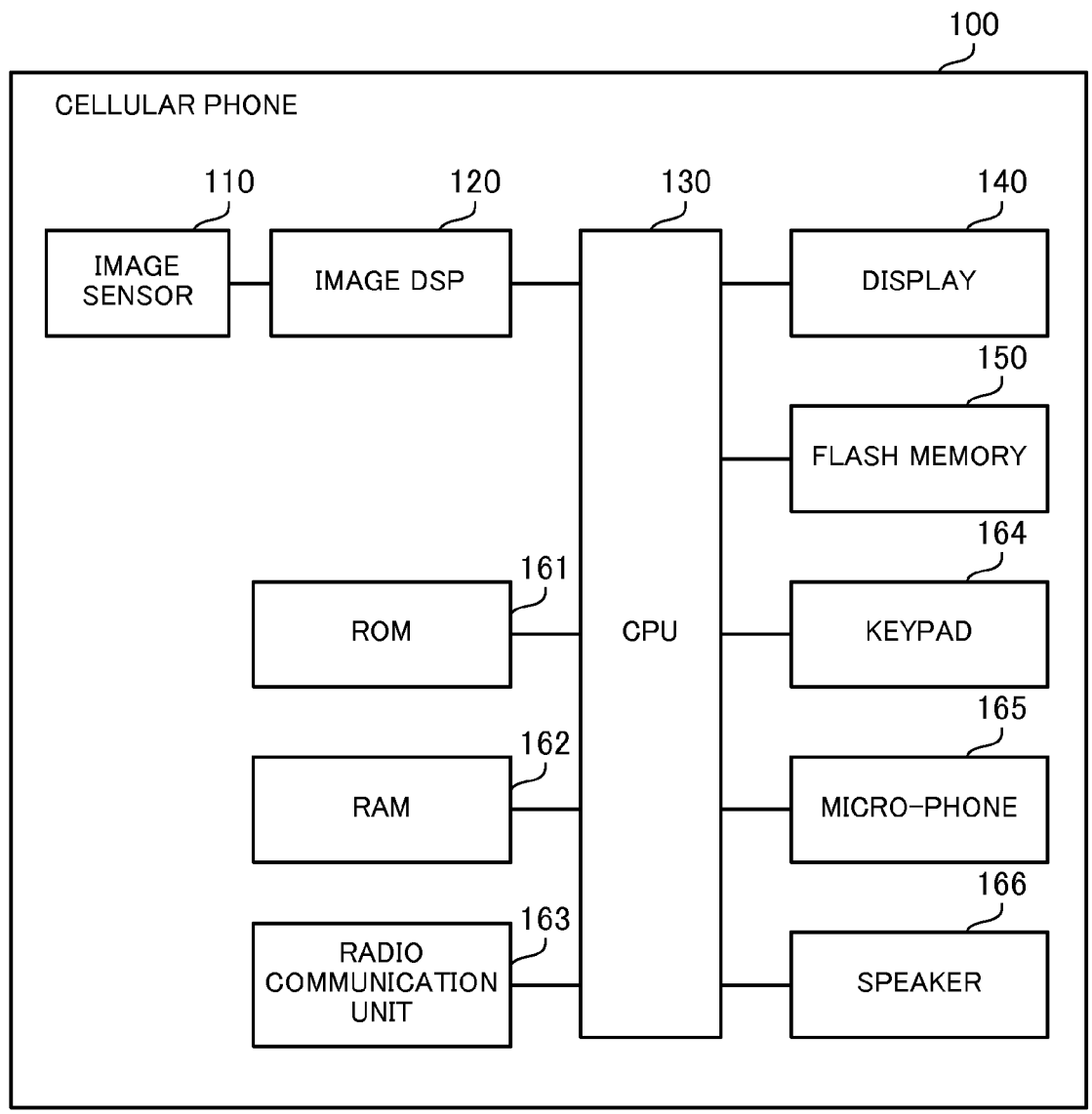
FIG. 2 is a block diagram illustrating a cellular phone according to a second embodiment.

FIG. 2 is a block diagram illustrating a cellular phone according to the second embodiment. The illustrated cellular phone 100 according to the second embodiment includes an image sensor 110, an image DSP 120, a central processing unit (CPU) 130, a display 140, a flash memory 150, a read only memory (ROM) 161, a random access memory (RAM) 162, a radio communication unit 163, a keypad 164, a microphone 165, and a speaker 166.

The image sensor 110 has a semiconductor circuit that converts light into an electronic signal. Examples of the image sensor 110 include a CCD sensor and a CMOS sensor. The image sensor 110 supplies RAW data of the taken image to the image DSP 120. When a user performs a continuous shooting operation (e.g., operation of continuously pressing a shutter button), the image sensor 110 continuously supplies the RAW data of the taken image to the image DSP 120 at a predetermined frame rate.

The image DSP 120 is a circuit that converts the image format of the image data. The image DSP 120 generates both of the YUV data and the JPEG data with respect to a single image from the RAW data acquired from the image sensor 110. The image DSP 120 then supplies the YUV data and the JPEG data on a time division basis to the CPU 130. During the continuous shooting operation, the image DSP 120 alternately supplies the YUV data and the JPEG data to the CPU 130 at 3 fps, respectively.

The CPU 130 is an arithmetic unit that controls functions of the cellular phone 100. The CPU 130 develops a program stored in the ROM 161 to the RAM 162 and executes it. The program executed by the CPU 130 includes a program for controlling a camera function.

With regard to the camera function, the CPU 130 performs a process of displaying the taken image on the display 140 and a process of storing the taken image in the flash memory 150. For example, the CPU 130 acquires the YUV data and the JPEG data on a time division basis from the image DSP 120. Further, the CPU 130 supplies the acquired YUV data to the display 140, and stores an image file including the acquired JPEG data in the flash memory 150. During the continuous shooting operation, the CPU 130 alternately performs a process of displaying the taken image on the display 140 and a process of storing the taken image in the flash memory 150 at 3 fps, respectively.

The display 140 is a display device that displays an operation screen generated by the CPU 130 or an image taken by the image sensor 110. Examples of the display 140 include an LCD. The display 140 acquires the YUV data from the CPU 130, and displays an image. During the continuous shooting operation, the display 140 acquires the YUV data of the taken image at 3 fps, and sequentially displays the taken image. Note that for suppressing a flicker on a screen, the display 140 displays a black image between the taken images. The display 140 acquires data of the black image from the CPU 130.

The flash memory 150 is a nonvolatile memory that stores various data including the image data. In the flash memory 150, the CPU 130 writes the image file including the JPEG data. During the continuous shooting operation, the CPU 130 sequentially writes the image file corresponding to the taken image in the flash memory 150 at 3 fps. In addition, the flash memory 150 may be a card memory detachable from the cellular phone 100. Further, in place of the flash memory 150, other types of nonvolatile storage media may be used.

The ROM 161 is a memory that previously stores a program executed by the CPU 130 and data referenced along with the execution of the program. The CPU 130 reads out the program and data stored in the ROM 161. The program stored in the ROM 161 includes a program for controlling a camera function. Note that in place of the ROM 161, a rewritable nonvolatile memory such as a flash memory may be used.

The RAM 162 is a volatile memory that temporarily stores at least a part of a program executed by the CPU 130 and data referenced along with the execution of the program. The CPU 130 performs writing in the RAM 162 and readout from the RAM 162. In place of the RAM 162, other types of memory may be used.

Under the control of the CPU 130, the radio communication unit 163 communicates wirelessly with other radio communication equipment such as a radio base station. For example, the radio communication unit 163 demodulates and decodes radio signals received via an antenna of the cellular phone 100, and supplies the acquired received data to the CPU 130. On the other hand, the radio communication unit 163 modulates and encodes transmission data acquired from the CPU 130, and wirelessly outputs the acquired transmission signal via the antenna.

The keypad 164 is an input device having multiple input keys. When a user presses any one of the input keys, the keypad 164 supplies an input signal indicating the pressed input key to the CPU 130. The input key includes a character key for inputting characters such as numerical characters and alphabet letters, and a function key for instructing a start and end of the imaging via the image sensor 110 and a start and end of the communication via radio transmission.

The microphone 165 converts physical vibrations of sounds into electrical signals to thereby receive a voice input, and supplies electrical signals as an audio signal to the CPU 130. For example, when a user makes communication by using the cellular phone 100, voices of the user or background signals on the side of the cellular phone 100 are supplied to the microphone 165.

Under the control of the CPU 130, the speaker 166 converts an electrical signal as an audio signal into physical vibrations to thereby reproduce sounds. For example, when the user makes communication by using the cellular phone 100, voices from a call partner or background signals of the call partner side are produced from the speaker 166.

The image sensor 110 illustrates one example of the image sensor 11 according to the first embodiment. The image DSP 120 illustrates one example of the conversion unit 12. The CPU 130 illustrates one example of the operating unit 13. The display 140 illustrates one example of the display device 14. The flash memory 150 illustrates one example of the storage device 15.

Figure 3:
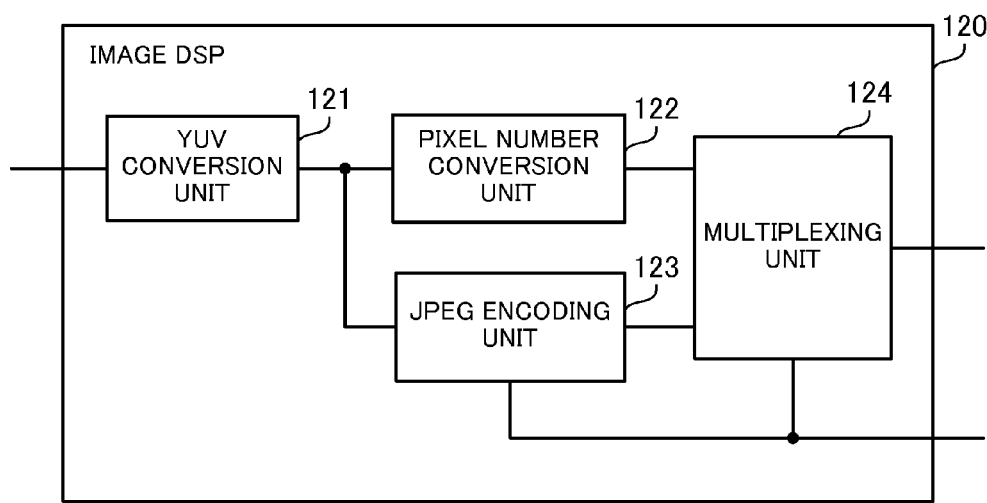
FIG. 3 is a block diagram illustrating an image DSP.

FIG. 3 is a block diagram illustrating the image DSP. The image DSP 120 has a YUV conversion unit 121, a pixel number conversion unit 122, a JPEG encoding unit 123, and a multiplexing unit 124.

The YUV conversion unit 121 converts the RAW data acquired from the image sensor 110 into the YUV data by image. The YUV conversion unit 121 then supplies the YUV data to the pixel number conversion unit 122 and the JPEG encoding unit 123.

Here, the YUV data includes data (Y data) of a Y component, data (Cb data) of a Cb component, and data (Cr data) of a Cr component. The Y data is a set of luminance signals. The Cb data is a set of color-difference signals representing a difference between the luminance signal and a blue component (B). The Cr data is a set of color-difference signals representing a difference between the luminance signal and a red component (R). According to the second embodiment, for example, YUV 422 is assumed as the image format. In the YUV 422, two adjacent pixels are expressed by a Y signal of two bytes, a Cb signal of one byte, and a Cr signal of one byte. Note that every image format except the image format of the YUV 422 can be used.

The pixel number conversion unit 122 performs a conversion of the number of pixels (normally, decrease in the number of pixels, namely, reduction in the image) with respect to the YUV data acquired from the YUV conversion unit 121. The number of pixels after the conversion corresponds to the number of pixels in the display 140. The reason is that the image having the number of pixels more than that in the display 140 can be stored in the flash memory 150. The number of pixels in the display 140 is equal to, for example, 640×480 pixels. The pixel number conversion unit 122 then supplies the YUV data after the conversion of the number of pixels to the multiplexing unit 124.

The JPEG encoding unit 123 encodes the YUV data acquired from the YUV conversion unit 121 to the JPEG data. For example, the JPEG encoding unit 123 performs a discrete cosine transform (DCT), and acquires an array of frequency components in units of 8×8 pixels of the YUV data. The JPEG encoding unit 123 then supplies the JPEG data to the multiplexing unit 124. Note that the number of pixels in the image (image stored in the flash memory 150) of the JPEG data is specified by the CPU 130 before a start of the imaging.

The multiplexing unit 124 time-division multiplexes the YUV data acquired from the pixel number conversion unit 122 and the JPEG data acquired from the JPEG encoding unit 123, and supplies the time-division multiplexed data to the CPU 130. For example, the multiplexing unit 124 inserts the YUV data or the JPEG data into a format commonly used in a transfer of the YUV data and that of the JPEG data. Then, the multiplexing unit 124 alternately supplies to the CPU 130 one data of the format including the YUV data and another data of the format including the JPEG data. The multiplexing unit 124 determines a format size before the start of the imaging based on the number of pixels in the image of the JPEG data specified by the CPU 130.

Figure 4:
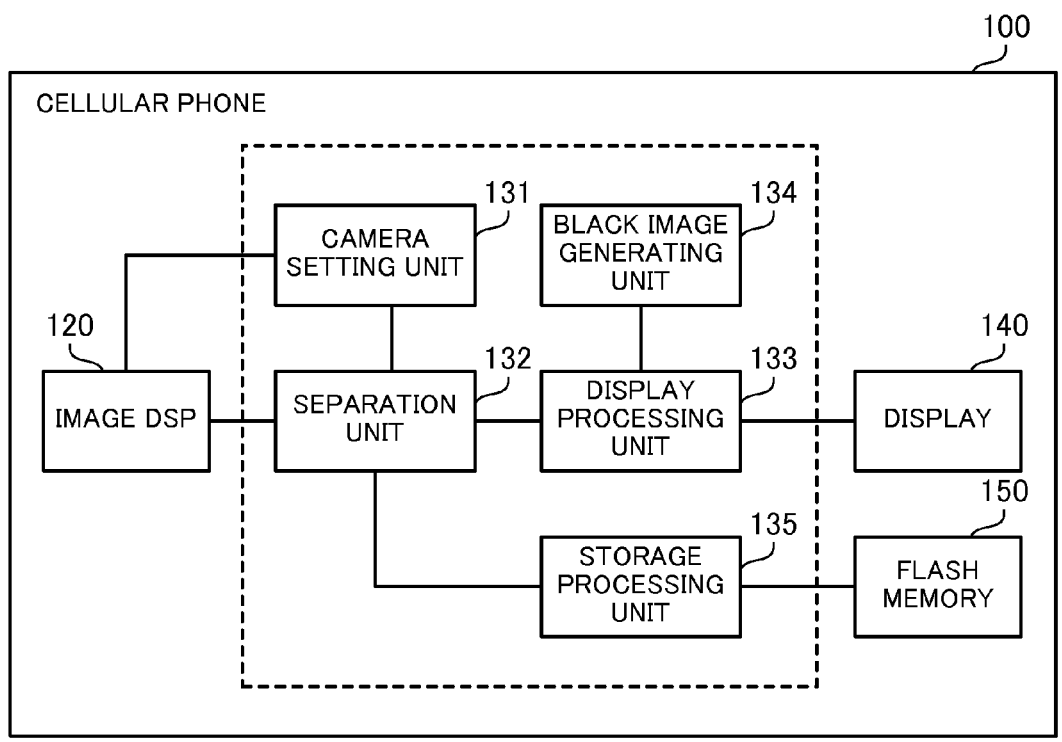
FIG. 4 is a block diagram illustrating display and storage functions of a CPU.

FIG. 4 is a block diagram illustrating display and storage functions of the CPU. When the CPU 130 executes a predetermined program, the cellular phone 100 realizes functions of a camera setting unit 131, a separation unit 132, a display processing unit 133, a black image generating unit 134, and a storage processing unit 135.

The camera setting unit 131 specifies the number of pixels in the image (image stored in the flash memory 150) of the JPEG data to the image DSP 120. The user selects the number of pixels in the image from among multiple candidates of the number of pixels in the image, for example, by using the keypad 164 before the start of the imaging. The number of pixels in the image is considered to be set to, for example, three million pixels. Further, the camera setting unit 131 calculates a format size of the data acquired from the image DSP 120 before the start of the imaging based on the number of pixels specified to the image DSP 120.

The separation unit 132 separates the data acquired from the image DSP 120 into the data of the format including the YUV data and that of the format including the JPEG data. Whether any of the YUV data and the JPEG data are inserted into the format is determined based on header information included in the format as described later. The separation unit 132 supplies the data of the format including the YUV data to the display processing unit 133. Further, the separation unit 132 supplies the data of the format including the JPEG data to the storage processing unit 135.

The display processing unit 133 extracts the YUV data from the format of the data acquired from the separation unit 132. The display processing unit 133 then supplies the extracted YUV data to the display 140. During the continuous shooting operation, the display processing unit 133 supplies to the display 140 the YUV data of a black image acquired from the black image generating unit 134 so as to be displayed between the YUV data of the taken image. That is, the display processing unit 133 alternately displays the taken image and the black image on the display 140 at 3 fps, respectively. Further, the display processing unit 133 supplies an audio signal of shutter sounds to the speaker 166 so as to make a shutter sound at the time of acquiring the YUV data of the taken image.

The black image generating unit 134 generates the YUV data for displaying a black image on the entire surface of the display 140, and supplies it to the display processing unit 133. The image displayed on the display 140 between the taken images is preferably a predetermined dummy image, and can do without a black image.

The storage processing unit 135 extracts the JPEG data from among the format of the data acquired from the separation unit 132. Since the JPEG data is a variable length data, the storage processing unit 135 refers to the header information and identifies a position into which the JPEG data is inserted, as described later. Then, the storage processing unit 135 generates a file including the extracted JPEG data, gives a file name thereto according to a predetermined rule, and stores it in the flash memory 150.

Figure 5:
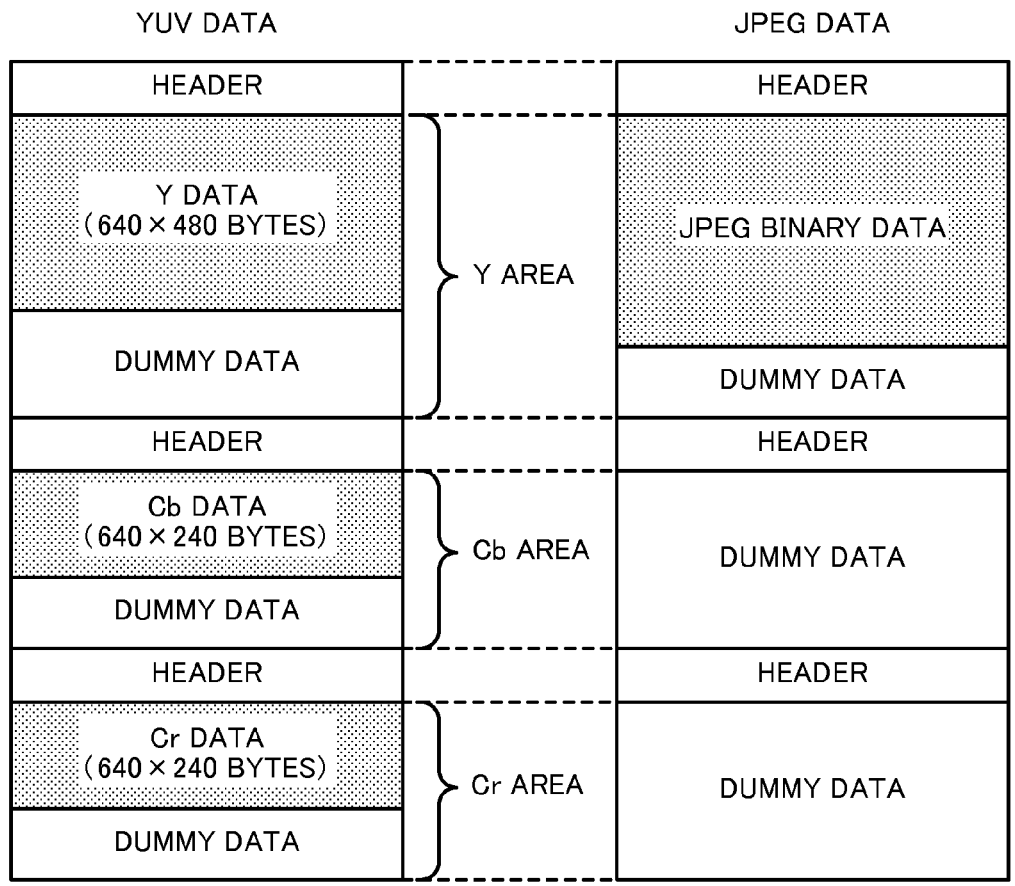
FIG. 5 illustrates a format example of image data.

FIG. 5 illustrates a format example of the image data. The format data illustrated in FIG. 5 is transferred from the image DSP 120 to the CPU 130. The format includes a Y area, a Cb area, and a Cr area. Ahead of each of the Y area, the Cb area, and the Cr area, a fixed length (e.g., as much as four lines) header area is provided.

The entire format size is determined according to the number of pixels in the image of the JPEG data. A ratio of the size between the Y area, the Cb area, and the Cr area is preferably matched with that of the data amount between the Y data, the Cb data, and the Cr data included in the YUV data. When the YUV 422 is used as an image format of the YUV data, the size ratio between the Y area, the Cb area, and the Cr area is 2:1:1. When the size ratio between the Y area, the Cb area, and the Cr area is made constant, a position of each area within the format is easily calculated.

In the format including the YUV data, the Y data of a fixed length (e.g., 640×480 bytes) is inserted into the Y area. Into the rest of the Y area, dummy data being an arbitrary bit sequence is inserted. Also, the Cb data of a fixed length (e.g., 640×240 bytes) is inserted into the Cb area. Into the rest of the Cb area, dummy data is inserted. In the same manner, the Cr data of a fixed length (e.g., 640×240 bytes) is inserted into the Cr area. Into the rest of the Cr area, dummy data is inserted. When removing the dummy data from the format, the display processing unit 133 can acquire the YUV data.

In the format including the JPEG data, the variable length JPEG data being binary data acquired by the JPEG encode is inserted into a part or all of Y area, Cb area, and Cr area. When extracting the JPEG binary data from the format, the storage processing unit 135 can generate the JPEG file.

As a method for inserting the JPEG binary data, several methods are considered. For example, a method for inserting the JPEG binary data only into the Y area is used. In this case, the format size is calculated so as to fit the entire JPEG binary data to the Y area. Further, a method for sequentially embedding the JPEG binary data in the Y area, the Cb area, and the Cr area is used. Also, a method for dividing the JPEG binary data into three by using a size ratio (e.g., 2:1:1) of the Y area, the Cb area, and the Cr area, and inserting them into the Y area, the Cb area, and the Cr area is used. In that case, the format size is calculated so as to fit the JPEG binary data in all of the Y area, Cb area, and Cr area.

Into the header area, the header information is inserted. The header information includes information indicating the format size, and meta information of an exchangeable image file format (EXIF) such as shutter speed. In addition, the header information includes information indicating an image format of the image data and information indicating a method for inserting the image data into the Y area, the Cb area, and the Cr area.

Figure 6:
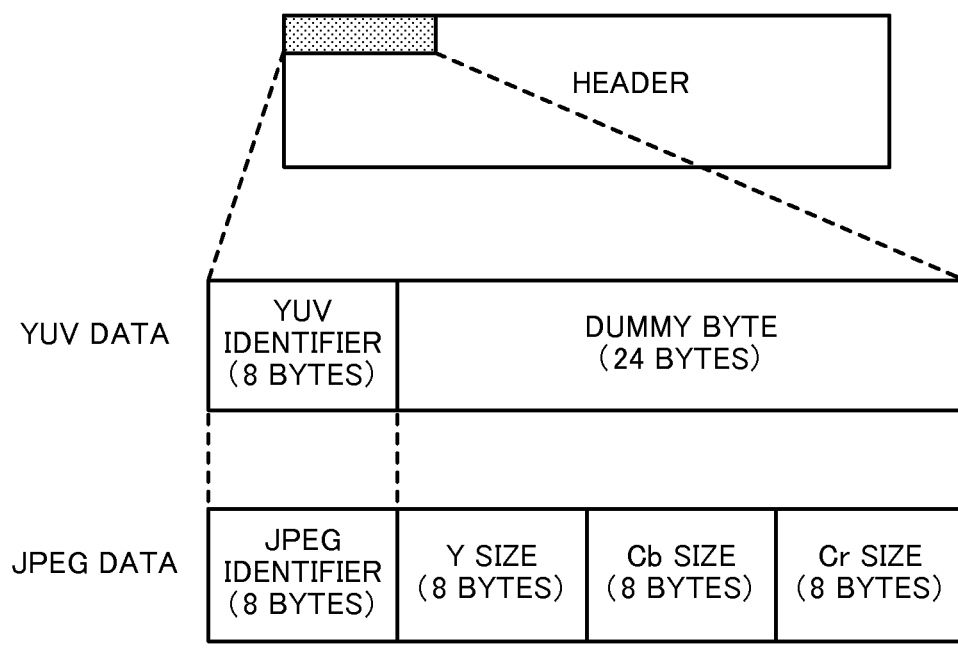
FIG. 6 illustrates a format example of a header of the image data.

FIG. 6 illustrates a format example of the header of the image data. The header information illustrated in FIG. 6 is inserted into the header area at the head of the format (ahead of the Y area). This header area is set, for example, to a fixed length of four lines. The header information includes a byte sequence of 32 bytes as information relating to a transfer of the YUV data and the JPEG data.

Here, 8 bytes of 32 bytes are a byte sequence indicating the image format and the presence or absence of the division of the JPEG binary data. When the YUV 422 data is inserted, a character code "59 55 56 34 32 32 00 00" indicating "the YUV 422" is set. When the JPEG binary data is not divided and inserted, a character code "4A 50 45 47 31 00 00 00" indicating "JPEG 1" is set. When the JPEG binary data is divided into three and inserted, a character code "4A 50 45 47 33 00 00 00" indicating "JPEG 3" is set.

Further, 3×8=24 bytes of 32 bytes are a byte sequence indicating a size of the JPEG binary data inserted into the Y area, the Cb area, and the Cr area. When the YUV 422 data is inserted, a dummy byte being an arbitrary byte sequence is set. When the JPEG binary data is inserted only into the Y area, a numerical value of 8 bytes indicating a size of the JPEG binary data and dummy bytes of 2×8 bytes are set. When the JPEG binary data is divided into three and inserted, a numerical value of 8 bytes indicating a size of the JPEG binary data in the Y area, a numerical value of 8 bytes indicating a size of the JPEG binary data in the Cb area, and a numerical value of 8 bytes indicating a size of the JPEG binary data in the Cr area are set.

Figure 7:
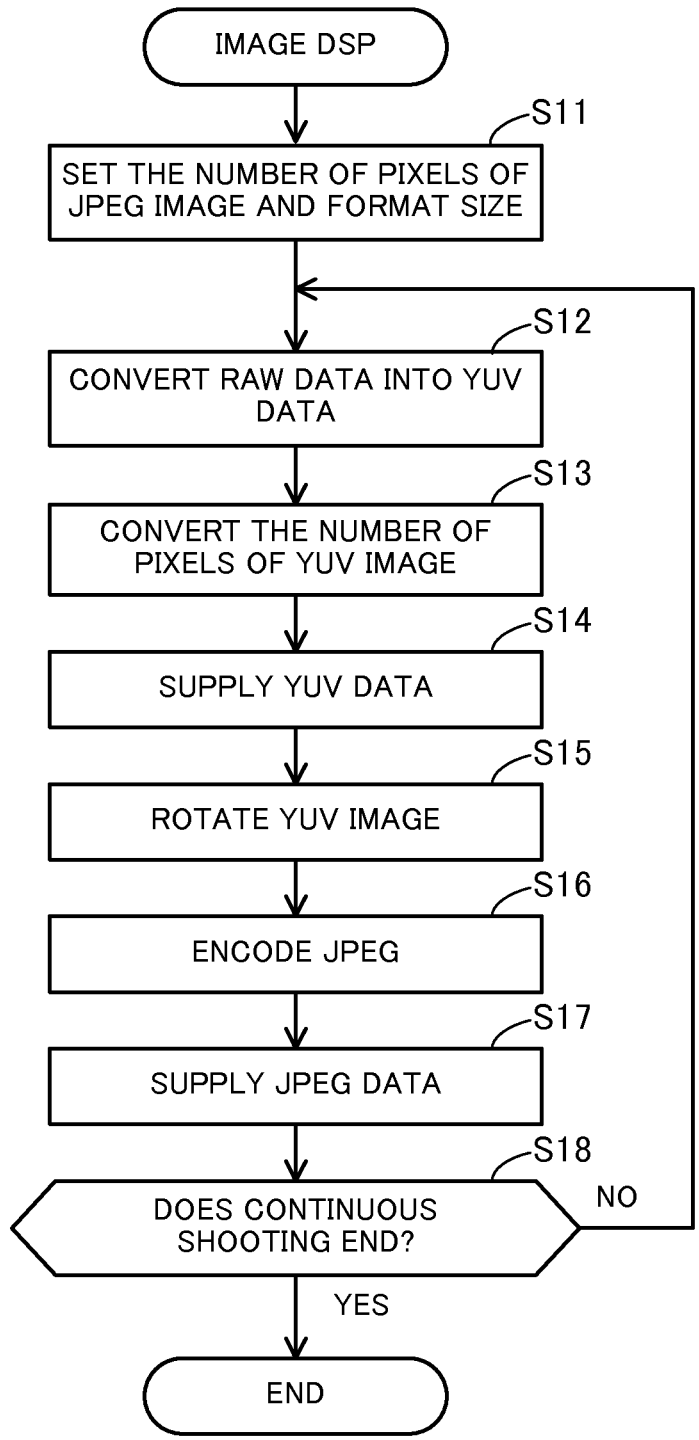
FIG. 7 is a flowchart illustrating an image DSP processing.

FIG. 7 is a flowchart illustrating image DSP processing. The illustrated flowchart illustrates a process in which the image DSP 120 performs during the continuous shooting operation. The process illustrated in FIG. 7 includes the following steps:

(Step S11) Before the start of the continuous shooting operation, for example, the JPEG encoding unit 123 sets the number of pixels specified by the CPU 130 as the number of pixels in the image of the JPEG data to be generated. Before the start of the continuous shooting operation, for example, the multiplexing unit 124 sets a format size based on the number of pixels specified by the CPU 130. As the number of pixels is larger, a format size is more increased. Further, the CPU 130 notifies the JPEG encoding unit 123 of the direction of the image taken by the image sensor 110, namely, that the cellular phone 100 is directed in a longitudinal direction or in a horizontal direction.

Here, the JPEG encoding unit 123 previously sets a method for calculating the format size commonly along with the CPU 130. As described above, the calculation method is different depending on the fact that any of the Y area, the Cb area, and the Cr area can be used in a transfer of the JPEG binary data. When all of the Y area, the Cb area, and the Cr area are used, it is possible to reduce the format size. The multiplexing unit 124 may previously hold information indicating a correspondence relationship between the number of pixels and the format size.

(Step S12) The YUV conversion unit 121 converts into the YUV data the RAW data as much as a single image acquired from the image sensor 110. The YUV conversion unit 121 then supplies the converted YUV data into both of the pixel number conversion unit 122 and the JPEG encoding unit 123.

(Step S13) The pixel number conversion unit 122 converts the number of pixels in the image of the YUV data acquired from the YUV conversion unit 121 so as to be matched with the number of pixels in the display 140. For example, the pixel number conversion unit 122 converts the number of pixels into 640×480 pixels of video graphics array (VGA) size.

(Step S14) The multiplexing unit 124 inserts the YUV data acquired from the pixel number conversion unit 122 into the format to supply it to the CPU 130. Specifically, the multiplexing unit 124 inserts the Y data into the Y area, the Cb data into the Cb area, and the Cr data into the Cr area, respectively. Further, the multiplexing unit 124 inserts identification data indicating the YUV data into the header area.

(Step S15) The JPEG encoding unit 123 performs a rotation operation of the image with respect to the YUV data acquired from the YUV conversion unit 121 according to the direction of the image notified from the CPU 130. When the direction of the taken image is matched with the direction of the image to be stored in the flash memory 150, the JPEG encoding unit 123 need not perform a rotation operation.

(Step S16) When performing an operation such as a DCT, the JPEG encoding unit 123 encodes the YUV data into the JPEG data.

(Step S17) The multiplexing unit 124 inserts the JPEG data acquired from the JPEG encoding unit 123 as binary data into the format, and supplies it to the CPU 130. As a method for inserting the JPEG binary data, several methods are considered as described above. For example, the multiplexing unit 124 divides the JPEG binary data into three, and inserts them into the Y area, the Cb area, and the Cr area. Further, into the header area, the multiplexing unit 124 inserts identification data indicating the JPEG data and information indicating the method for inserting the JPEG binary data.

(Step S18) The YUV conversion unit 121 determines whether the continuous shooting operation ends, specifically, supply of the RAW data from the image sensor 110 is stopped. When the continuous shooting operation ends, the process ends. When the continuous shooting operation fails to end, the process proceeds to step S12.

As can be seen from the above sequence, during the continuous shooting operation, the image DSP 120 inserts the YUV data for display and the JPEG data for storage into the common format, and alternately supplies them to the CPU 130. In an example of FIG. 7, the image DSP 120 first supplies the YUV data and secondly supplies the JPEG data to the CPU 130 with respect to each image; however, an output order of the YUV data and the JPEG data may be reversed.

Figure 8:
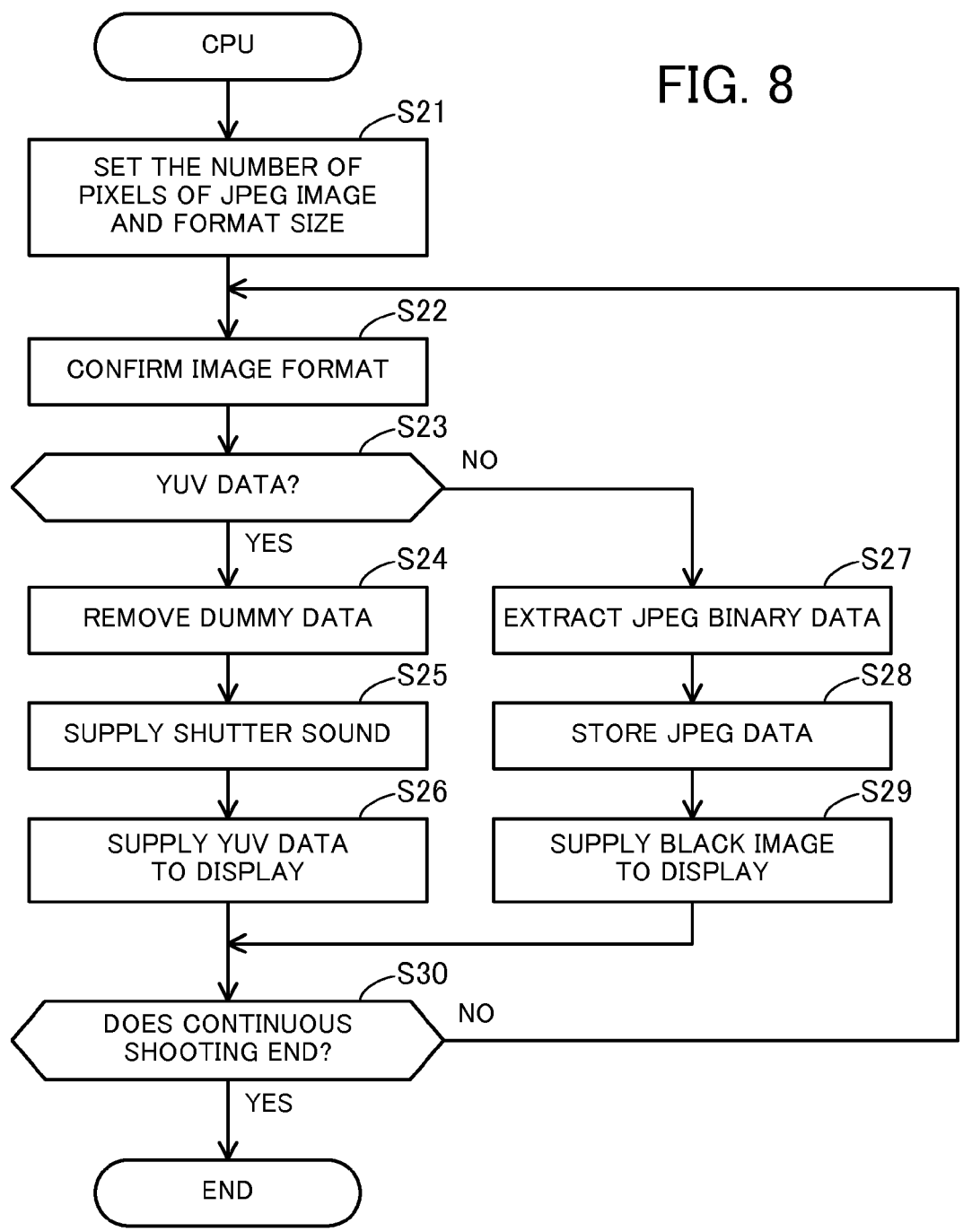
FIG. 8 is a flowchart illustrating a CPU processing.

FIG. 8 is a flowchart illustrating CPU processing. This flowchart illustrates a process in which a program is executed and is realized by the CPU 130 during the continuous shooting operation. The process illustrated in FIG. 8 includes the following steps:

(Step S21) The camera setting unit 131 specifies the number of pixels in the image to be stored in the flash memory 150 to the image DSP 120, for example, before the start of the continuous shooting operation. With regard to the number of pixels, for example, one (e.g., three million pixels) is selected from among multiple candidates of the number of pixels by a screen operation of a user. Further, based on the number of pixels, the camera setting unit 131 calculates the format size used for an output of the image data through the image DSP 120. As described above, the camera setting unit 131 previously sets a method for calculating the format size commonly along with the image DSP 120. The camera setting unit 131 may previously hold information indicating a correspondence relationship between the number of pixels and the format size. Further, the camera setting unit 131 detects a direction (a longitudinal direction or horizontal direction) of the cellular phone, and notifies the image DSP 120 of the direction of the taken image.

(Step S22) When acquiring data as much as a single image from the image DSP 120, the separation unit 132 extracts the identification data indicating the image format from the header area.

(Step S23) Based on the identification data extracted in step S22, the separation unit 132 determines whether the image data inserted into the format is the YUV data. If the image data is the YUV data, the process proceeds to step S24. If the image data is not the YUV data, namely, it is the JPEG data, the process proceeds to step S27.

(Step S24) The display processing unit 133 calculates positions of the Y area, the Cb area, and the Cr area based on the format size calculated by the camera setting unit 131 in step S21. The display processing unit 133 then removes dummy data included in each area of the format.

(Step S25) The display processing unit 133 supplies an audio signal indicating a shutter sound to the speaker 166. This process permits the shutter sound to be reproduced by the speaker 166.

(Step S26) The display processing unit 133 supplies to the display 140 the YUV data obtained by removing the dummy data included in the format. This process permits the display 140 to display the image taken by the image sensor 110. The process then proceeds to step S30.

(Step S27) The storage processing unit 135 calculates positions of the Y area, the Cb area, and the Cr area based on the format size calculated by the camera setting unit 131 in step S21. Further, from the header area, the storage processing unit 135 extracts information indicating the method for inserting the JPEG binary data. The storage processing unit 135 then identifies an insertion range in the Y area, the Cb area, and the Cr area, and extracts the JPEG data inserted as binary data.

(Step S28) The storage processing unit 135 generates an image file including the JPEG data extracted in step S27. Then, the storage processing unit 135 gives a file name to the generated image file based on a predetermined rule, and stores it in the flash memory 150.

(Step S29) The black image generating unit 134 generates data on the black image to be displayed on the display 140. The display processing unit 133 supplies the black image data generated by the black image generating unit 134 to the display 140. As a result, while the taken image is displayed in step S26, the black image is displayed on the display 140.

(Step S30) The separation unit 132 determines whether the continuous shooting operation ends, namely, the supply of the image data from the image DSP 120 is stopped. When the continuous shooting operation ends, the process ends. If the continuous shooting operation fails to end, the process proceeds to step S22.

Figure 9:
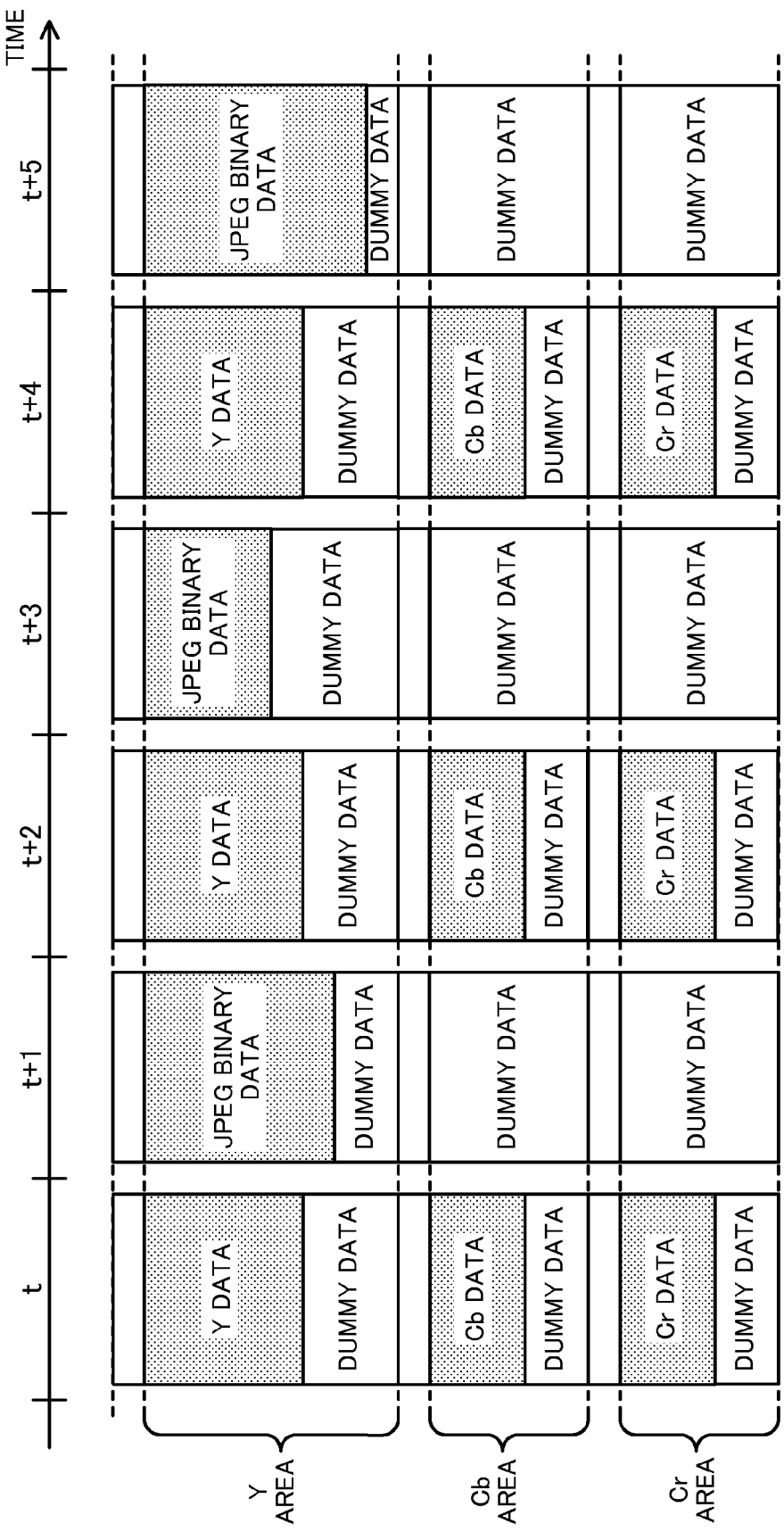
FIG. 9 illustrates a first insertion method of JPEG binary data.

FIG. 9 illustrates a first insertion method of the JPEG binary data. In the first insertion method, the JPEG binary data is inserted only into the Y area among the Y area, the Cb area, and the Cr area. Accordingly, the format size is determined according to the number of pixels in the JPEG image so as to fit the JPEG binary data in the Y area.

In the time t, the format data including the YUV data of a certain image is transferred from the image DSP 120 to the CPU 130. In the time t+1, the format data including the JPEG binary data of the same image as that of the time t is transferred from the image DSP 120 to the CPU 130. The JPEG binary data is inserted only into the Y area.

In the time t+2, the format data including the YUV data of the image different from that of the time t is transferred from the image DSP 120 to the CPU 130. A size of the YUV data is the same as that of the time t. In the time t+3, the format data including the JPEG binary data of the same image as that of the time t+2 is transferred from the image DSP 120 to the CPU 130. The JPEG binary data is inserted only into the Y area. Note that a size of the JPEG binary data may be different from that of the time t+1.

In the time t+4, the format data including the YUV data of the image different from that of the time t+2 is transferred from the image DSP 120 to the CPU 130. A size of the YUV data is the same as that of the time t+2. In the time t+5, the format data including the JPEG binary data of the same image as that of the time t+4 is transferred from the image DSP 120 to the CPU 130. The JPEG binary data is inserted only into the Y area. Note that a size of the JPEG binary data may be different from that of the time t+3.

Figure 10:
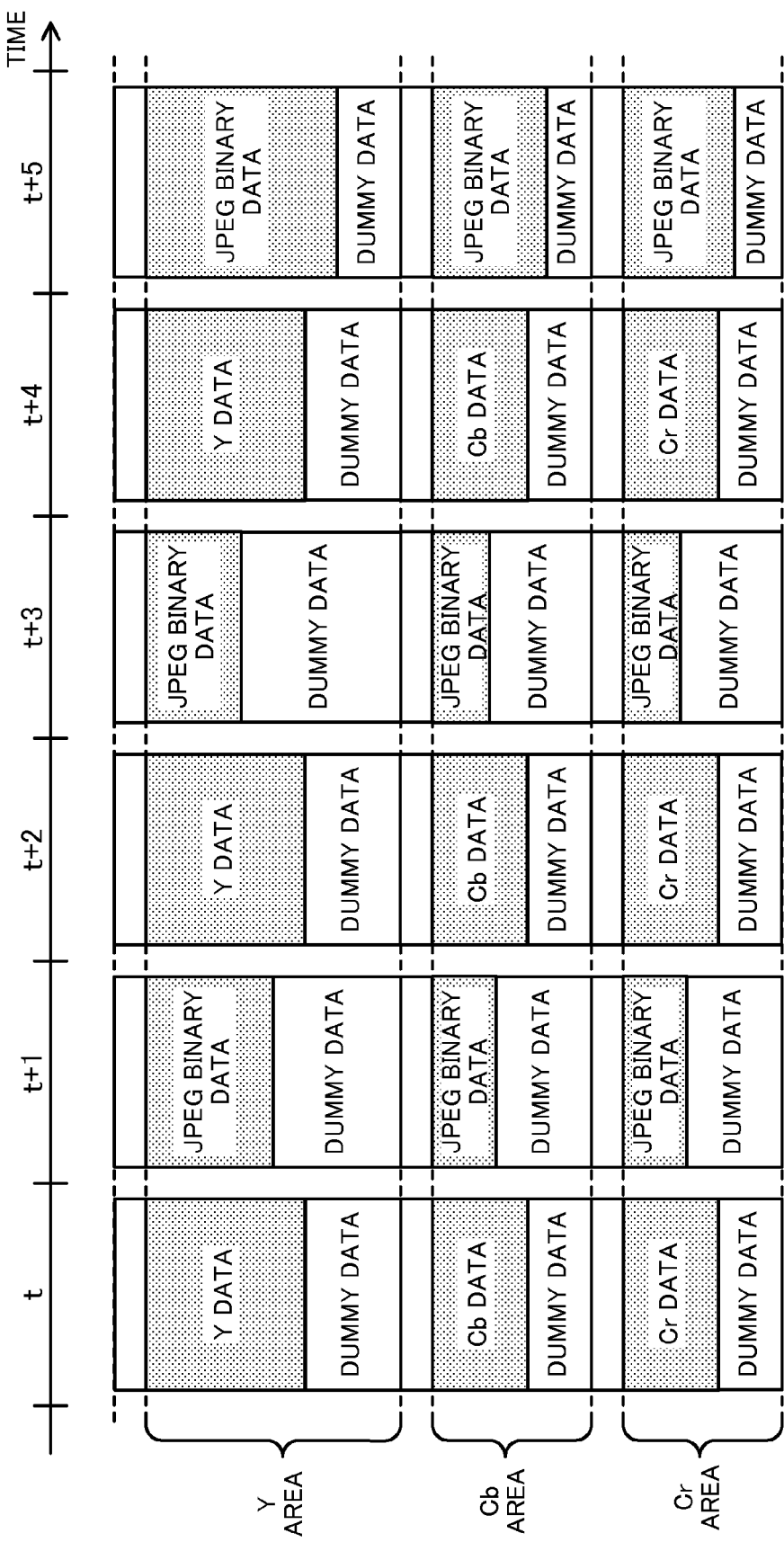
FIG. 10 illustrates a second insertion method of the JPEG binary data.

FIG. 10 illustrates a second insertion method of the JPEG binary data. In the second insertion method, the JPEG binary data is divided into three according to a size ratio (e.g., 2:1:1) among the Y area, the Cb area, and the Cr area, and inserted into the Y area, the Cb area, and the Cr area. Accordingly, the format size is determined according to the number of pixels in the JPEG image so as to fit the JPEG binary data in all of the Y area, Cb area, and Cr area.

In the time t, the format data including the YUV data of a certain image is transferred from the image DSP 120 to the CPU 130. In the time t+1, the format data including the JPEG binary data of the same image as that of the time t is transferred from the image DSP 120 to the CPU 130. The JPEG binary data is distributed into three areas and inserted thereinto.

In the time t+2, the format data including the YUV data of the image different from that of the time t is transferred from the image DSP 120 to the CPU 130. A size of the YUV data is the same as that of the time t. In the time t+3, the format data including the JPEG binary data of the same image as that of the time t+2 is transferred from the image DSP 120 to the CPU 130. The JPEG binary data is distributed into three areas and inserted thereinto. Note that a size of the JPEG binary data in each area may be different from that of the time t+1.

In the time t+4, the format data including the YUV data of the image different from that of the time t+2 is transferred from the image DSP 120 to the CPU 130. A size of the YUV data is the same as that of the time t+2. In the time t+5, the format data including the JPEG binary data of the same image as that of the time t+4 is transferred from the image DSP 120 to the CPU 130. The JPEG binary data is distributed into three areas and inserted thereinto. Note that a size of the JPEG binary data in each area may be different from that of the time t+3.

Figure 11:
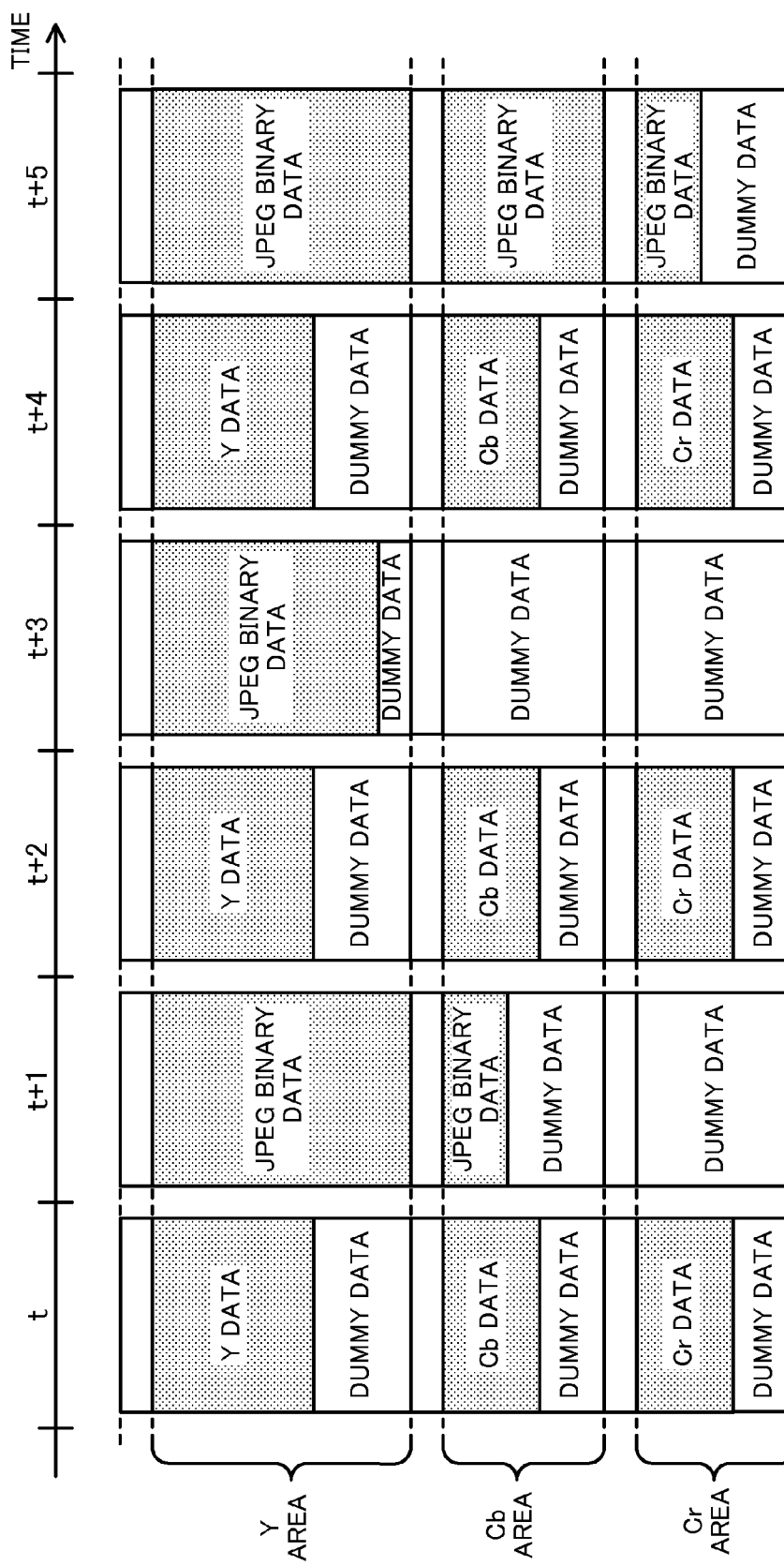
FIG. 11 illustrates a third insertion method of the JPEG binary data.

FIG. 11 illustrates a third insertion method of the JPEG binary data. In the third insertion method, the JPEG binary data is sequentially embedded in the Y area, the Cb area, and the Cr area, in this order. Accordingly, the format size is determined according to the number of pixels in the JPEG image so as to fit the JPEG binary data in all of the Y area, Cb area, and Cr area.

In the time t, the format data including the YUV data of a certain image is transferred from the image DSP 120 to the CPU 130. In the time t+1, the format data including the JPEG binary data of the same image as that of the time t is transferred from the image DSP 120 to the CPU 130. Here, a size of the JPEG binary data is larger than that of the Y area, and is smaller than or equal to a total of those of the Y area and the Cb area. As a result, the JPEG binary data is inserted into the Y area and the Cb area among the Y area, the Cb area, and the Cr area.

In the time t+2, the format data including the YUV data of the image different from that of the time t is transferred from the image DSP 120 to the CPU 130. A size of the YUV data is the same as that of the time t. In the time t+3, the format data including the JPEG binary data of the same image as that of the time t+2 is transferred from the image DSP 120 to the CPU 130. Here, a size of the JPEG binary data is smaller than that of the Y area. As a result, the JPEG binary data is inserted only into the Y area among the Y area, the Cb area, and the Cr area.

In the time t+4, the format data including the YUV data of the image different from that of the time t+2 is transferred from the image DSP 120 to the CPU 130. A size of the YUV data is the same as that of the time t+2. In the time t+5, the format data including the JPEG binary data of the same image as that of the time t+4 is transferred from the image DSP 120 to the CPU 130. Here, a size of the JPEG binary data is larger than a total of those of the Y area and the Cb area. As a result, the JPEG binary data is inserted into three areas.

Figure 12:
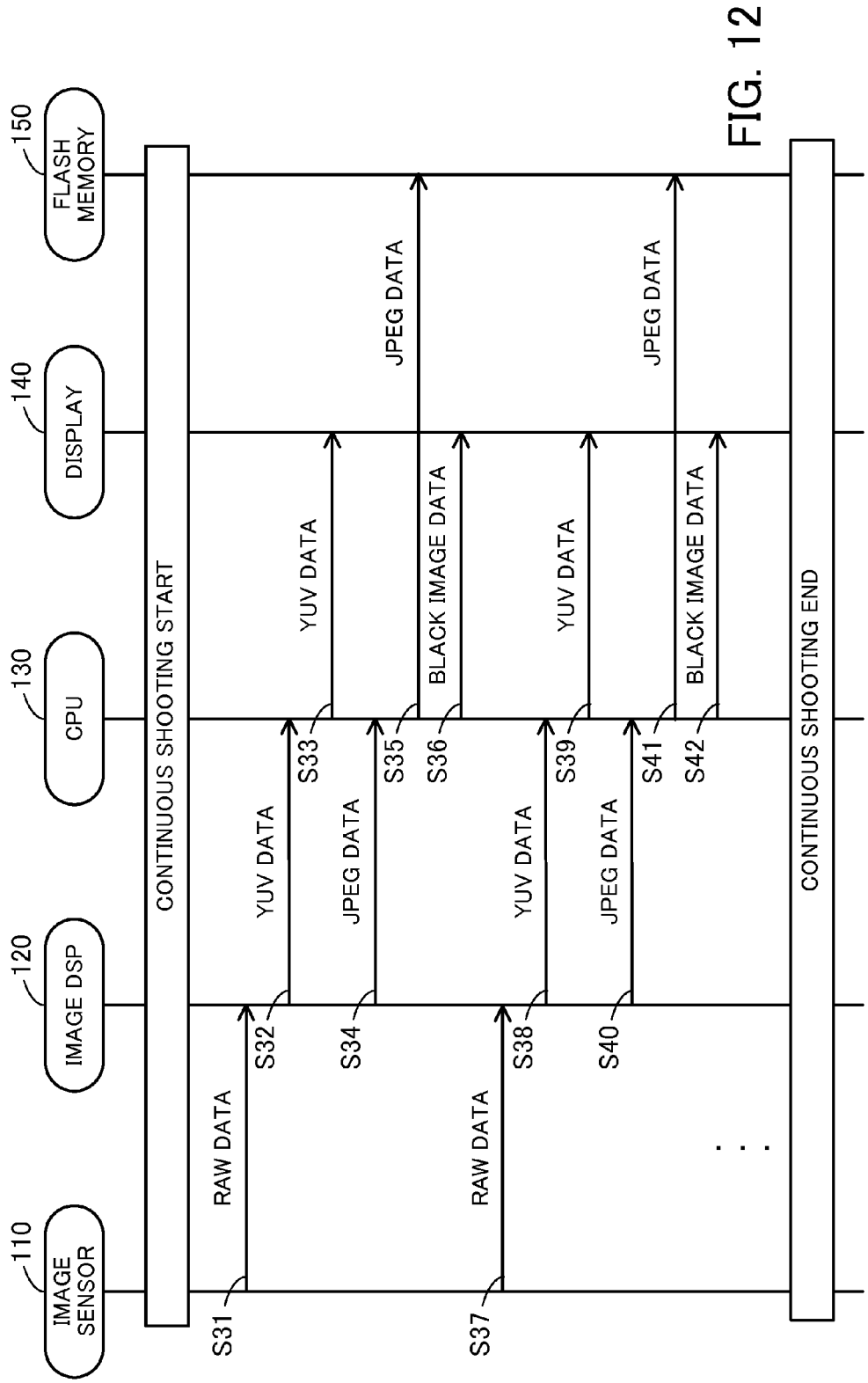
FIG. 12 is a sequence diagram illustrating a flow of a transfer of the image data.

FIG. 12 is a sequence diagram illustrating a flow of a transfer of the image data. During the continuous shooting operation, among the image sensor 110, the image DSP 120, the CPU 130, the display 140, and the flash memory 150, data is transferred along a flow as illustrated in FIG. 12.

The image sensor 110 supplies the RAW data of the taken image to the image DSP 120 (Step S31). The image DSP 120 converts the RAW data into the YUV data, and supplies it to the CPU 130 (Step S32). The CPU 130 supplies the YUV data to the display 140 (Step S33). The image DSP 120 encodes the YUV data into the JPEG data, and supplies it to the CPU 130 (Step S34). The CPU 130 stores the JPEG data in the flash memory 150 (Step S35), and supplies the black image data to the display 140 (Step S36).

With regard to the following images, the same processes as those of steps S31 to S36 are performed (Steps S37 to S42). As can be seen from the above discussion, the display processing and storage processing to each image taken by the image sensor 110 are repeated until the end of the continuous shooting operation. When the image data is temporarily stored in a buffer in the RAM 162, acquisition (Steps S32 and S34) of the YUV data and the JPEG data can be performed asynchronously with the display processing and the storage processing (Steps S33 and S35). As a result, after acquiring the JPEG data (Step S34), the CPU 130 may perform the display processing (Step S33).

According to the second embodiment, the proposed cellular phone 100 can smoothly perform continuous display and storage of the image during the continuous shooting operation. Specifically, since the image DSP 120 generates both of the YUV data for display and the JPEG data for storage and alternately supplies them to the CPU 130, a load of the CPU 130 is reduced. Further, since the image DSP 120 supplies the image data to the CPU 130 by using the common format, the CPU 130 is easy to alternately extract the image data of different image formats. As a result, the cellular phone 100 can suppress a load of the CPU 130 from being bottlenecked and the continuous shooting available time from being restricted. In the cellular phone 100, for example, since the CPU 130 performs every processing except control processing of the camera function, reduction in the load is effective.

Since generating the YUV data and the JPEG data, the image DSP 120 is easy to make the number of pixels in the image to be stored in the flash memory 150 larger than the number of pixels in the display 140. When changing the format size according to the number of pixels in the JPEG image, the image DSP 120 can suppress increase in the format size and reduce a load of the process. When distributing and inserting the JPEG binary data into the Y area, the Cb area, and the Cr area within the format, the image DSP 120 can suppress increase in the format size and reduce a load of the process. When inserting the identification data indicating the image format into the header area of the format, the image DSP 120 can easily determine the image format of the image data acquired by the CPU 130. Further, when displaying a black image between the taken images, flickering of the image at the time when the image data for display and the image data for storage are alternately produced from the image DSP 120 can be suppressed.

As can be seen from two embodiments discussed above, the proposed image data processing apparatus and method permit a cellular phone to smoothly perform continuous processes of multiple images taken by an image sensor.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions and alterations could be made hereto without departing from the spirit and scope of the invention.

What is claimed is:

1. An image data processing apparatus to process data of multiple images taken by an image sensor, comprising:
   a conversion unit configured to generate first image data of a first image format and second image data of a second image format, insert each of the first and second image data into a format commonly used in the first and second image data, and supply the first and second image data on a time division basis with respect to each of the taken images; and
   an operating unit configured to acquire the first and second image data produced on a time division basis from the conversion unit, perform a process for displaying one or more of the taken images on a display device by using the first image data, and perform a process for storing one or more of the taken images in a storage device by using the second image data, wherein:
the first image data includes data of multiple components,
the format commonly used includes multiple areas corresponding to the multiple components, and
the conversion unit inserts the second image data into one predetermined area among the multiple areas, or distributes the second image data into the multiple areas to insert the distributed second image data into the multiple areas.

2. The image data processing apparatus according to claim 1, wherein:
the format includes header information indicating an image format of the inserted image data; and
the operating unit refers to the header information, and extracts the first image data or the second image data inserted into the format.

3. The image data processing apparatus according to claim 1, wherein:
the operating unit specifies a number of pixels in the second image data to the conversion unit; and
the conversion unit changes a size of the format according to the number of pixels in the second image data specified by the operating unit.

4. The image data processing apparatus according to claim 1, wherein the operating unit performs, when acquiring the second image data, a process for displaying a dummy image on the display device.

5. The image data processing apparatus according to claim 1, wherein the conversion unit sequentially acquires the multiple image data from the image sensor, and alternately supplies the first and second image data.

6. An image data processing method for use in an apparatus having a conversion unit and an operating unit, to process multiple image data taken by an image sensor, the method comprising:
causing the conversion unit to generate first image data of a first image format and second image data of a second image format, insert each of the first and second image data into a format commonly used in the first and second image data, and to supply the first and second image data on a time division basis with respect to each of the taken images;
causing the operating unit to use the first image data among the first and second image data supplied on a time division basis, and perform a process for displaying one or more of the taken images on a display device; and
causing the operating unit to use the second image data among the first and second image data supplied on a time division basis, and perform a process for storing one or more of the taken images in a storage device,
wherein:
the first image data includes data of multiple components,
the format commonly used includes multiple areas corresponding to the multiple components, and
the conversion unit inserts the second image data into one predetermined area among the multiple areas, or distribute the second image data into the multiple areas to insert the distributed second image data into the multiple areas.

* * * * *